(12) United States Patent
Liao (10) Patent No.: US 6,969,800 B1
(45) Date of Patent: Nov. 29, 2005

(54) HUB CONCEALED BY TABLETOP (76) Inventor: Hsueh-Shu Liao, 3F., 200, Sec. 3, Xin Yi Rd., Taipei City 106 (TW)

( * ) Notice: Subject to any disclaimer, the term of this patent is extended or adjusted under 35 U.S.C. 154(b) by 0 days.

(21) Appl. No.: 10/915,324

(22) Filed: Aug. 11, 2004

(51) Int. Cl.$^7$ ............................................. H02G 3/08
(52) U.S. Cl. ............................ 174/50; 174/58; 174/63; 174/60; 248/906; 439/535
(58) Field of Search .......................... 174/50, 48, 17 R, 174/58, 63, 65 R, 60, 135; 220/3.3, 3.6, 3.8, 220/4.02; 248/906; 439/535; 361/600

(56) References Cited

U.S. PATENT DOCUMENTS

| | | | |
|---|---|---|---|
| 5,276,279 A * | 1/1994 | Brownlie et al. | 174/65 R |
| 5,545,848 A * | 8/1996 | Lin | 174/52.1 |
| 6,518,500 B1 * | 2/2003 | Huang | 174/50 |
| 6,548,755 B2 * | 4/2003 | Wu | 174/50 |
| 6,695,643 B2 * | 2/2004 | Wu | 439/545 |
| 6,743,978 B2 * | 6/2004 | Wu | 174/50 |
| 6,768,054 B2 * | 7/2004 | Sato et al. | 174/50 |

* cited by examiner

*Primary Examiner*—Dhiru R. Patel
(74) *Attorney, Agent, or Firm*—Dennison, Schultz, Dougherty & MacDonald (57) ABSTRACT

The present invention relates to a hub concealed by tabletop, where a top lid is joined to a bottom casing and a space within the hub is configured to receive multiple electrical components. The hub includes a plurality of resilient key buttons to be secured to the apertures formed on opposing sides of the base to allow the hub to rotate about the resilient key buttons over the base. The hub is rotatable to an exposed state in use or a concealed state when not in use by the engagement between two tennon devices and tennon openings of the base, wherein the base is further pressed into a circular opening preformed on tabletop by the opposing securing tabs so as to join to the tabletop. The hub may be rotated to expose out of the tabletop in use, and to be concealed underneath the tabletop when not in use.

1 Claim, 7 Drawing Sheets

HUB CONCEALED BY TABLETOP

CROSS-REFERENCES TO RELATED APPLICATIONS

Not Applicable

STATEMENT REGARDING FEDERALLY SPONSORED RESEARCH OR DEVELOPMENT

Not Applicable

DESCRIPTION

1. Field of Invention

The present invention relates to a hub, particularly, to a concealed hub that may be rotated to project out of tabletop in use, and rotated to be concealed underneath a table when not in use.

2. Background

Along with the improvement of PC and Internet, their peripheral equipments requires various power wires, telephone lines and internet cables, which would easily tangle with each other to result in a disorder and unsystematic appearance without a proper organization and eventually directly affect the outward appearance and indirectly affect the working atmosphere and efficiency. Thus, there is a need to organize the frequently used power sockets, telephone line sockets and internet cables socket and collect the same in a hub for proper arrangement. It is also essential to provide a hub capable of integrating wire and lines, while capable of meeting the ergonomic needs of the user and beautifying the working environment at the same time.

SUMMARY OF INVENTION

In view of the above, the present invention provides a hub capable of integrating wire and lines, while capable of meeting the ergonomic needs of the user and beautifying the working environment at the same time. In other words, it is a primary objective of the present invention to provide a hub concealed by tabletop having a simple construction with an ingenious spatial plan, where after a top lid is joined to a bottom casing, a space within the hub is able to receive various electrical components. The hub includes resilient key buttons to be secured to apertures formed on opposing sides of the base, to allow the hub to rotate about the resilient key buttons over the base. The hub can be rotated to an exposed state in use or a concealed state when not in use by means of engagement between two tennon devices and tennon openings of the base. The base is further pressed into a circular opening preformed on tabletop by means of opposing securing tabs so as to join to the tabletop, whereby the hub may be rotated to expose out of the tabletop in use, and to be concealed underneath the tabletop when not in use.

BRIEF DESCRIPTION OF THE DRAWINGS

These and other modifications and advantages will become even more apparent from the following detained description of a preferred embodiment of the invention and from the drawings in which.

DETAILED DESCRIPTION OF THE INVENTION (PREFERRED EMBODIMENTS)

Figure 1:
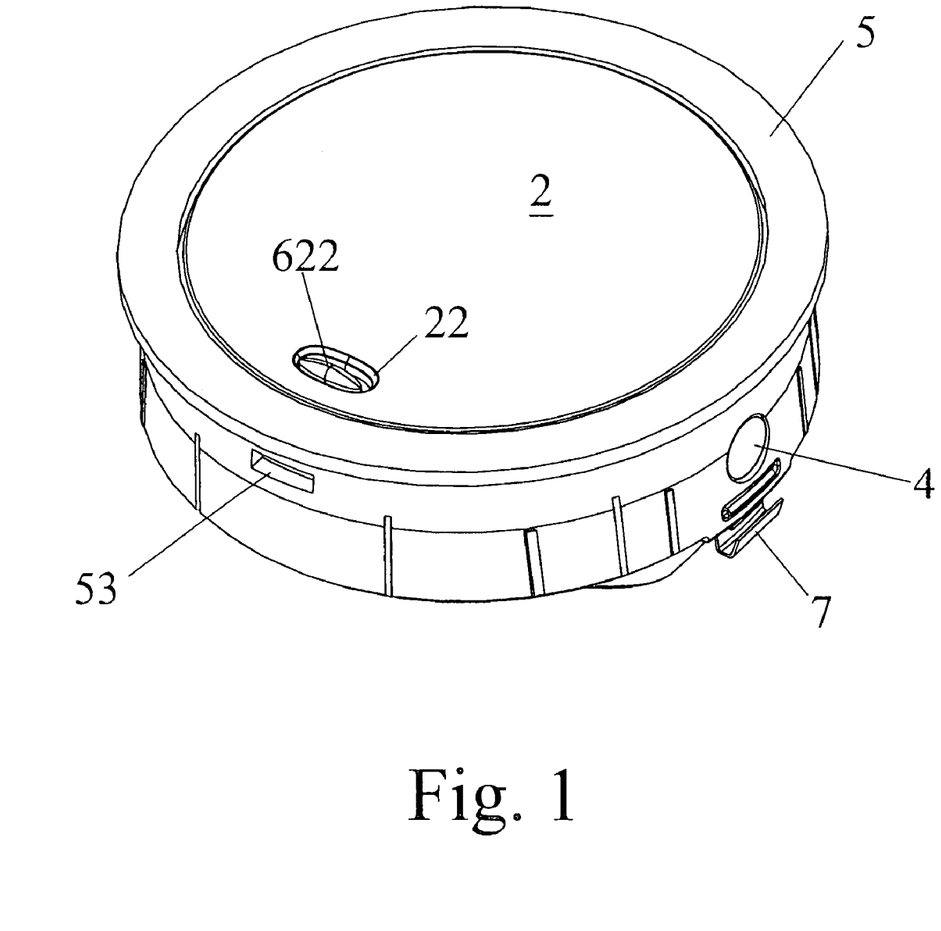
FIG. 1 is a top, perspective view illustrating the present invention being concealed underneath the tabletop when not in use.
Figure 2:
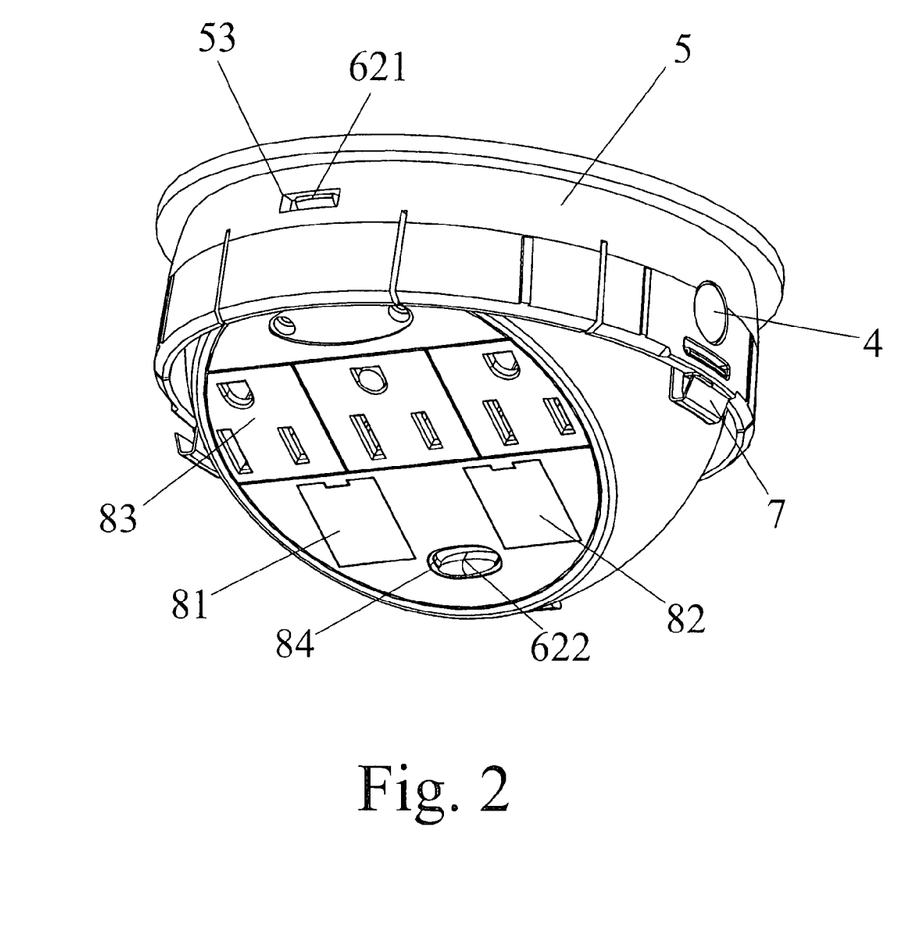
FIG. 2 is a bottom, perspective view illustrating the present invention being concealed underneath the tabletop when not in use.
Figure 3:
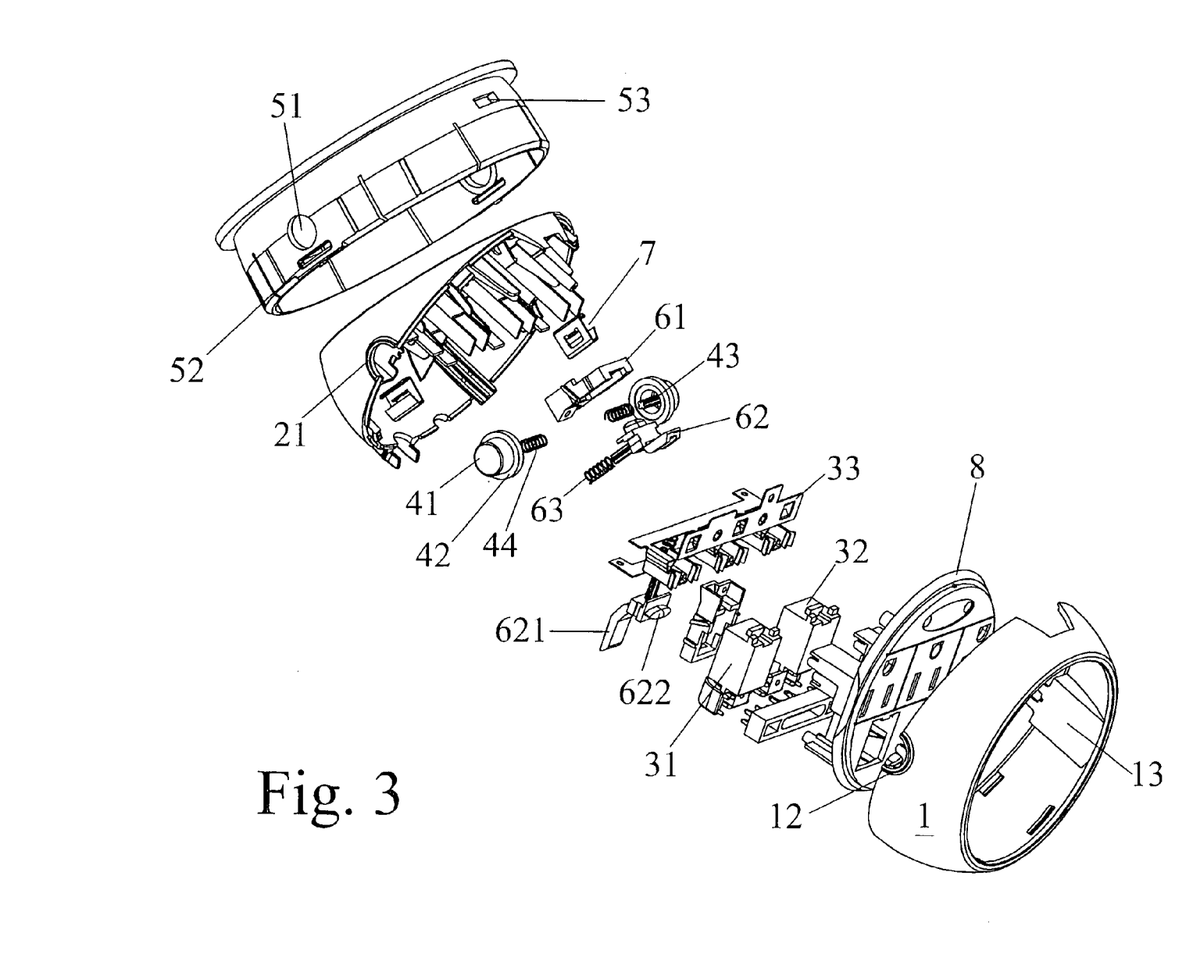
FIG. 3 is an exploded, perspective view of the present invention.
Figure 4:
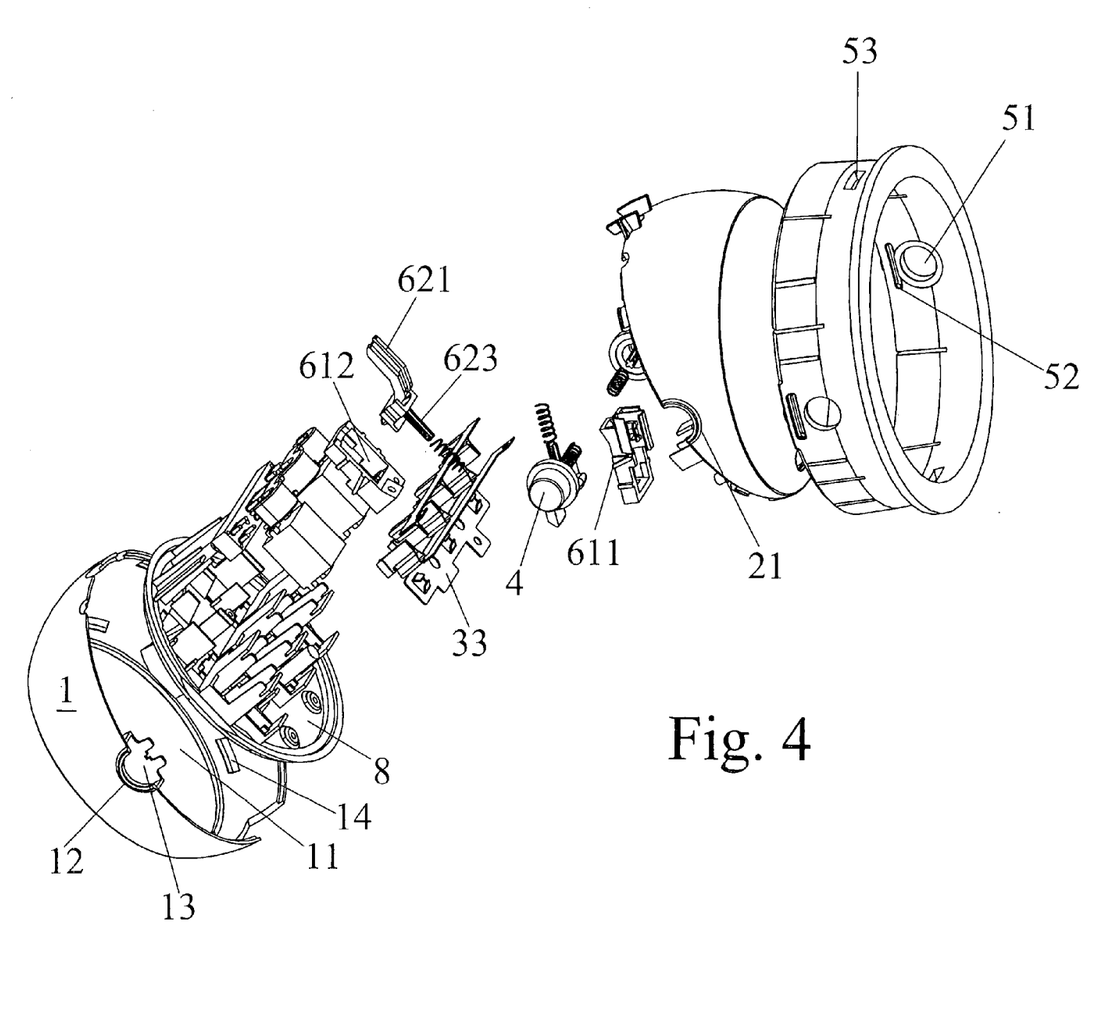
FIG. 4 is another exploded, perspective view of the present invention viewed from a different angle.
Figure 5:
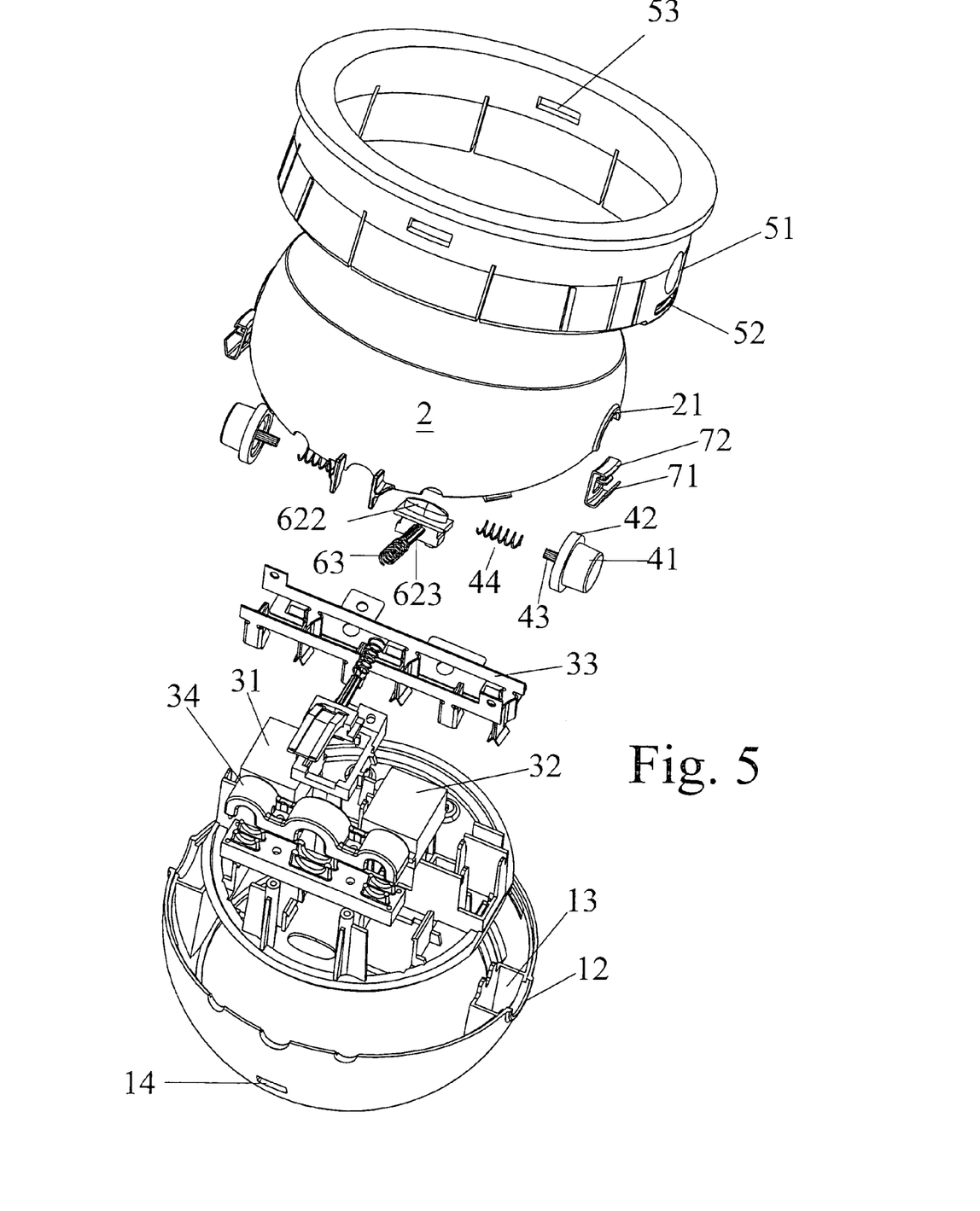
FIG. 5 is another exploded, perspective view of the present invention viewed from yet another different angle.
Figure 6:
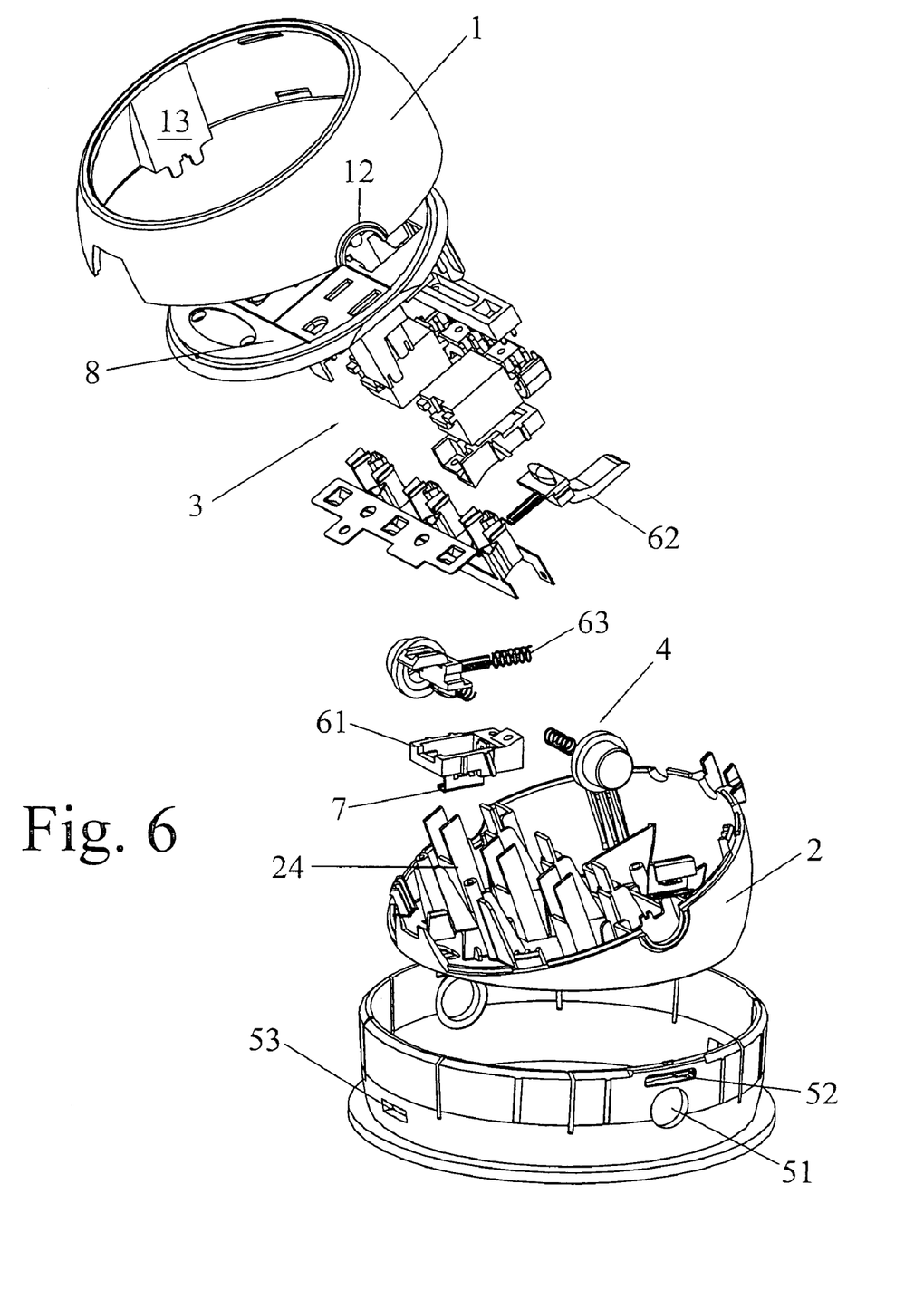
FIG. 6 is another exploded, perspective view of the present invention viewed from yet another different angle.
Figure 7:
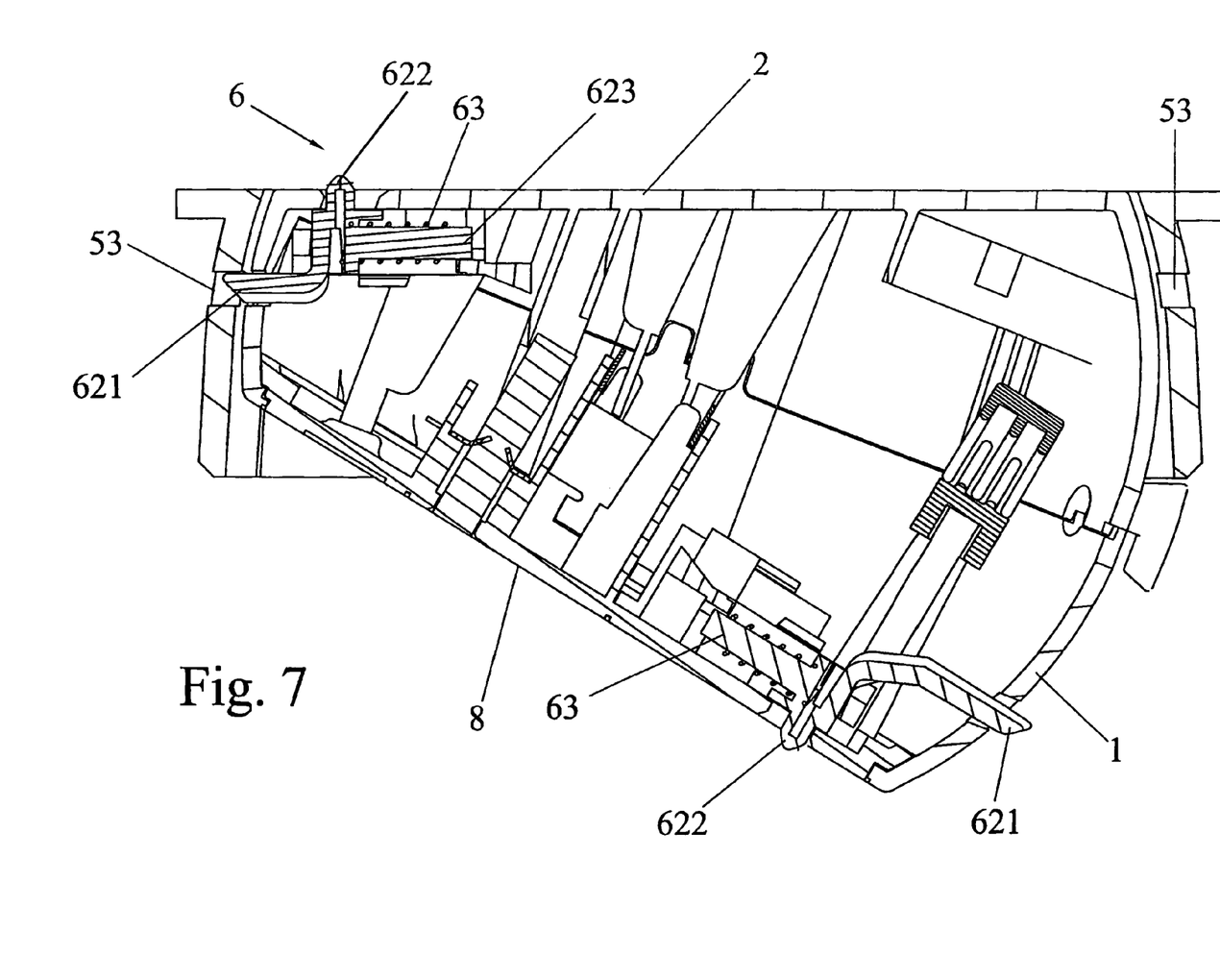
FIG. 7 is a cross-sectional vie illustrating the present invention being concealed underneath the tabletop when not in use.

With reference to FIGS. 1 to 7, FIG. 1 is a top, perspective view illustrating the present invention being concealed underneath the tabletop when not in use; FIG. 2 is a bottom, perspective view illustrating the present invention being concealed underneath the tabletop when not in use; FIGS. 3 to 6 are exploded, perspective views of the present invention viewed from different angles; and FIG. 7 is a cross-sectional view illustrating the present invention being concealed underneath the tabletop when not in use.

Generally, according to the present invention, after a top lid 1 is joined to a bottom casing 2, a space within the hub is able to receive various electrical components 3. The hub includes resilient key buttons 4 to be secured to apertures formed on opposing sides of the base 5 to allow the hub to rotate about the resilient key buttons 4 over the base 5. The hub is rotatable to an exposed state in use or a concealed state when not in use by means of engagement between two tennon devices 6 and tennon openings of the base 5. The base 5 is further pressed into a circular opening preformed on tabletop by means of opposing securing tabs 7 so as to join to the tabletop, whereby the hub may be rotated to expose out of the tabletop in use, and to be concealed underneath the tabletop when not in use.

The top lid 1, as shown in FIGS. 3 to 6, is configured to a hemisphere with an angle of elevation. The top lid 1 is formed at a center thereof with a planar circular opening 11 for securing a hub panel 8, at opposing sides thereof with semicircular openings 12 and positioning notches 13 to be secured to semicircular openings 21 and indents 23 formed on opposing sides of the bottom casing 2 for retaining the resilient key buttons 4, and at a rear center thereof with rectangular tennon openings 14 into which the tennon devices 6, that will be described later, engage.

The hub panel 8, as shown in FIG. 2, is secured in the planar circular opening 11 at the center of the top lid 1 and preformed with telephone line openings 81, internet cable openings 82, power socket openings 83 a push-button opening 84.

The bottom casing 2, as shown in FIG. 3 to FIG. 6, is substantially configured to a hemisphere with an angle of elevation corresponding to the top lid 1, and is formed at a bottom of a closed plane thereof with a push-button opening 22, at opposing sides thereof corresponding to where the semicircular openings 12 of the top lid 1 are formed with the semicircular openings 21 and the indents 23 for receiving the resilient key buttons 4 that will be described latter, and plural sockets 24 integrally formed to the bottom casing 2 for retaining the hub components.

The base 5, as shown in FIG. 3 to FIG. 6, is a hollow round base, formed at opposing sides thereof with apertures 51 for retaining the resilient key buttons 4, rectangular retaining slots 52 at locations neighboring the apertures 51 for retaining the securing tabs 7, and rectangular tennon openings 53 at a front and rear end thereof for engaging with the respective tennon devices 6.

The electrical components 3, as shown in FIGS. 3 to 6, includes telephone line sockets 31, internet cable sockets 32, power sockets 33, and wire sockets 34, that are, respectively, retained in the telephone line openings 81, internet cables openings 82 and power socket openings 83 formed on the hub panel 8 and the respective sockets 24 of the bottom casing 2, for retaining the electrical components in the space formed by joining the top lid 1 and the bottom casing 2. The electrical components 3 are directed to the conventional art and not described in details herein.

The two resilient key buttons 4, as shown in FIGS. 3 to 6, are received in the opposing positioning notches 13 of the top lid 1 and the opposing indents 23 of the bottom casino 2, wherein the key button includes round buttons 41 that are retained in a respective circular retaining opening jointly defined by the opposing semicircular openings 12, 21 of the top lid 1 and bottom casing 2, the key buttons each having a flange 42 urging against an inner edge of the retaining circular retaining openings, and a shaft 43 with an end inserting into a spring 44 and then retained to a respective aperture jointly defined by the positioning notches 13 of the top lid 1 and the indents 23 of the bottom casing 2, so as to constrain the springs 44 between the flanges 42 and sidewalls jointly defined by the positioning notches 13 of the top lid 1 and the indents 23 of the bottom casing 2, thereby exerting an outward force against the key buttons 4.

The two tennon devices 6, as shown in FIGS. 3 to 6, each include a tennon base 61, a tennon body 62 and a spring 63, wherein tennon bases 61 are each secured beneath the hub panel 8 and to the socket of the bottom casing 2 by means of opposing slideways 611, the tennon bases 61 each having a rectangular opening 612 for receiving the respective tennon bodies 62, the tennon bodies 62 each including a wedged tennon 621, a protruding oval push-button 622 and a shaft 623, wherein when the shafts 623 are inserted into the respective springs 63 and rest against the respective rectangular openings 612 of the tennon bases 61, so as to constrain the springs 63 between short sides of the respective rectangular openings 612, thereby exerting an outward force against the tennon bodies 62;

The two securing tabs 7, as shown in FIGS. 3 to 6, each include an open tab 71 having an inverse-U body including forwards, a closed retaining ring 72 engaging with the respective rectangular retaining slots 52 formed at locations neighboring the apertures 51 of the base 5, whereby the hub is able to be pressed into a circular opening preformed on a table top by means of the including open tabs 71 to join to the tabletop.

After assembling the parts of the present invention as described above, as shown in FIGS. 1, 2 and 6, the top lid 1 is joined to the bottom casing 2 to define a space within the hub that is able to receive various electrical components 3. The hub constructed by joining the top lid 1 and bottom casing 2 is able to rotate about an axis defined by securing the resilient key buttons 4 to the opposing apertures 51 of the base over the base 5. The wedged tennons 621 of the tennon bodies would then be secured in the tennon openings 53 of the base 5 by means of the outwardly exerting force, to take on a state that is concealed underneath the tabletop as shown in FIGS. 1 and 2. When a user pushes the push-button 622 protruding from the push-button opening 22 formed on the bottom of the bottom casing 2 rearwards, the tennon bodies 62 would press against the springs 63 to detach wedged tennons 621 from the tennon openings 53 of the base 5. At this time, the hub is rotated until the tennon devices 6 provided beneath the hub panel 8 are secured to the respective tennon openings 52 of the base 52, whereby the hub panel 8 is able to provide the user with an operation plane meeting ergonomic needs by inclining forwards at an angle. Accordingly, the hub may be rotated to expose out of the tabletop in use, and to be concealed underneath the tabletop when not in use.

In summary, the hub of the present invention may be pressed into a circular opening formed on the tabletop by means of the opposing securing tabs of the base so as to join to the tabletop. The top lid and bottom casing further jointly define a space in the hub for receiving various electrical components. The resilient key buttons are secured to the opposing apertures of the base to allow the hub to rotate about the resilient key buttons over the base. The engagement between the two tennon devices the tennon openings of the base allows the hub to rotate and position at an exposed state in use or a concealed state when not in use by means of engagement between two tennon devices and tennon openings of the base. The base is further pressed into a circular opening preformed on tabletop by means of opposing securing tabs so as to join to the tabletop, whereby the hub may be rotated to expose out of the tabletop in use, and to be concealed underneath the tabletop when not in use.

This invention is related to a novel creation that makes a breakthrough in the art. Aforementioned explanations, however, are directed to the description of preferred embodiments according to this invention. Since this invention is not limited to the specific details described in connection with the preferred embodiments, changes and implementations to certain features of the preferred embodiments without altering the overall basic function of the invention are contemplated within the scope of the appended claims.

| Listing of Nomenclatures | | |
|---|---|---|
| 1 top lid | 11 planar circular opening | 12 semicircular openings |
| 13 positioning notch | 14 rectangular tennon opening | |
| 2 bottom casing | 21 semicircular openings | 22 push-button opening |
| 23 indent | 24 socket | |
| 3 electrical components | 31 telephone lines socket | 32 internet cables socket |
| 33 power socket | 34 wire socket | |
| 4 key button | 41 round button | 42 flange |
| 43 shaft | 44 spring | |
| 5 base | 51 aperture | 52 rectangular retaining slot |
| 53 rectangular tennon opening | | |
| 6 tennon device | 61 tennon base | 611 slideways |
| 612 rectangular opening | 62 tennon body | 621 wedged tennon |
| 622 protruding oval push-button | 623 shaft | 63 spring |
| 7 securing tabs | 71 open tab | 72 closed retaining ring |
| 8 hub panel | 81 telephone lines opening | 82 internet cables opening |
| 83 power socket opening | 84 push-button opening | |

What is claimed is:

1. A hub concealed by tabletop, comprising: a top lid joined to a bottom casing for defining a space within the hub that is able to receive multiple electrical components, the hub including resilient key buttons to be secured to apertures formed on opposing sides of a base to allow the hub to rotate about the resilient key buttons over the base, the hub being rotatable to an exposed state in use or a concealed state when not in use by means of engagement between two tennon devices and tennon openings of the base, characterized in that:

the top lid has a hemispherical configuration with an angle of elevation and formed at a center thereof with a planar circular opening for securing a hub panel, and further includes a plurality of semicircular openings at opposing sides thereof and positioning notches to be secured to said semicircular openings and indents formed on opposing sides of the bottom casing for retaining the resilient key buttons, the top lid further includes the rectangular tennon openings at a rear center thereof into which the tennon devices engage;

the hub panel is secured in the planar circular opening at the center of the top lid and preformed with telephone line openings, internet cable openings, power socket openings a push-button opening;

the bottom casing is substantially configured to a hemisphere with an angle of elevation corresponding to the top lid, and formed at a bottom of a closed plane thereof with push-button openings, the semicircular openings of the top lid are formed with the semicircular openings and indents for receiving the resilient key buttons;

the base is a hollow round base and includes a plurality of apertures at opposing sides thereof for retaining the resilient key buttons, rectangular retaining slots at locations neighboring the apertures for retaining the securing tabs, and the rectangular tennon openings at a front and rear end thereof for engaging with one of the tennon devices;

the resilient key buttons are received in the positioning notches of the top lid and the opposing indents of the bottom casing, wherein the key button includes round buttons that are retained in a respective circular retaining opening jointly defined by the opposing semicircular openings of the top lid and bottom casing, the key buttons each having a flange urging against an inner edge of the retaining circular retaining openings, and a shaft with an end inserting into a spring and then retained to a respective aperture jointly defined by the positioning notches of the top lid and the indents of the bottom casing, so as to constrain the spring between the flanges and sidewalls jointly defined by the positioning notches of the top lid and the indents of the bottom casing, thereby exerting an outward force against the key buttons;

the two tennon devices each includes a tennon base, a tennon body and the spring, wherein tennon bases are each secured beneath the hub panel and to the socket of the bottom casing by means of opposing slideways, the tennon bases each having a rectangular opening for receiving the respective tennon bodies, the tennon bodies each including a wedged tennon, a protruding oval push-button and a shaft, wherein when the shafts are inserted into the respective springs and rest against the respective rectangular openings of the tennon bases, so as to constrain the springs between short sides of the respective rectangular openings, thereby exerting an outward force against the tennon bodies; and the securing tabs each include an open tab having an inverse-U body including forwards, a closed retaining ring engaging with the respective rectangular retaining slots formed at locations neighboring the apertures of the base, whereby the hub is able to be pressed into a circular opening preformed on a table top by means of the including open tabs to join to the tabletop.

* * * * *